United States Patent
Garnjost et al.

[11] Patent Number: 5,533,933
[45] Date of Patent: Jul. 9, 1996

[54] ARCADE AMUSEMENT RIDE MOTION SIMULATOR SYSTEM

[75] Inventors: Kenneth D. Garnjost, Buffalo; James C. Stegner, Stow, both of N.Y.

[73] Assignee: Moog Inc., East Aurora, N.Y.

[21] Appl. No.: 419,231

[22] Filed: Apr. 10, 1995

Related U.S. Application Data

[63] Continuation of Ser. No. 148,633, Nov. 5, 1993, abandoned.

[51] Int. Cl.$^6$ ................................................. A63G 31/16
[52] U.S. Cl. ................................................. 472/60; 472/130
[58] Field of Search ................................ 472/59, 60, 61, 472/130, 136, 137; 434/55, 58, 59

[56] References Cited

U.S. PATENT DOCUMENTS 4,856,771   8/1989   Nelson ........................... 472/60
5,060,932  10/1991   Yamaguchi ..................... 472/60 X Primary Examiner—Kien T. Nguyen
Attorney, Agent, or Firm—Phillips, Lytle, Hitchcock, Blaine & Huber

[57] ABSTRACT

An improved motion simulator (10) includes a base (11), a capsule (14) having an at least partially-spherical smooth outer surface (15). The capsule is capable of roll, pitch and yaw angular motions about a pivot point (16) at the center of the spherical surface, and is also capable for upward and downward heave motion of the pivot point along a vertical axis (z—z) relative to the base. Actuators (33, 34, 35) are operatively arranged to selectively move the capsule relative to the base in any of four degrees of freedom. The capsule outer surface is configured such that no possible motion of the capsule in any of the permissible four degrees of freedom will cause any portion of the capsule to move outside of a motion envelope formed by an imaginary vertical cylinder (41) having a diameter (d) substantially equal to that of the spherical surface.

15 Claims, 1 Drawing Sheet

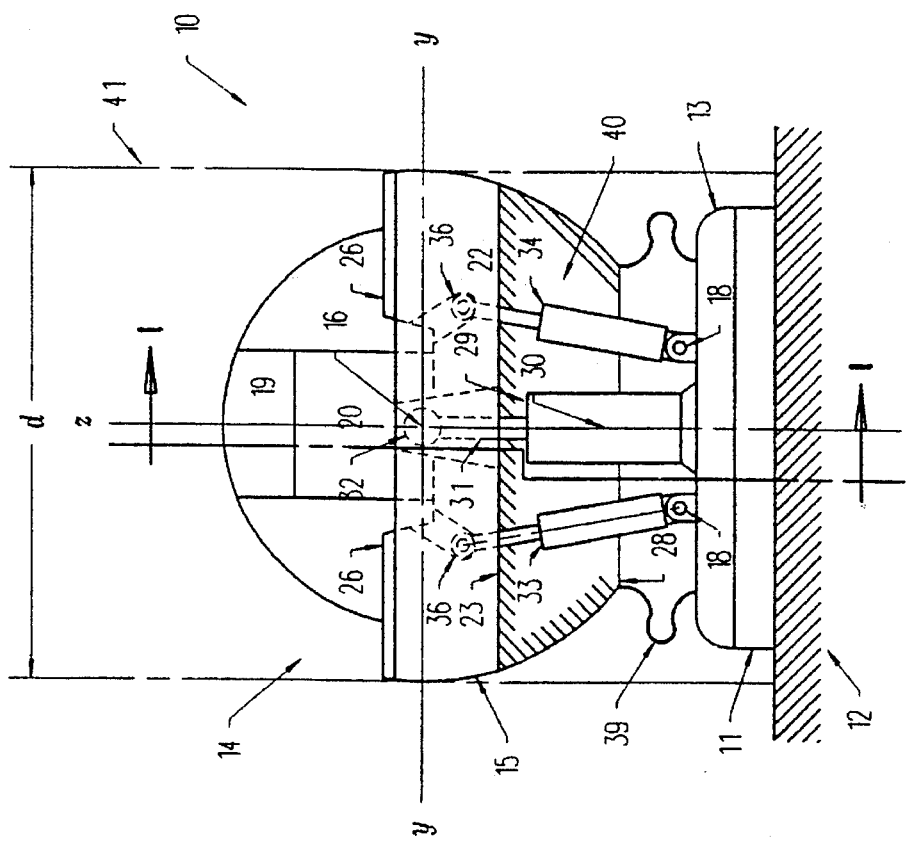
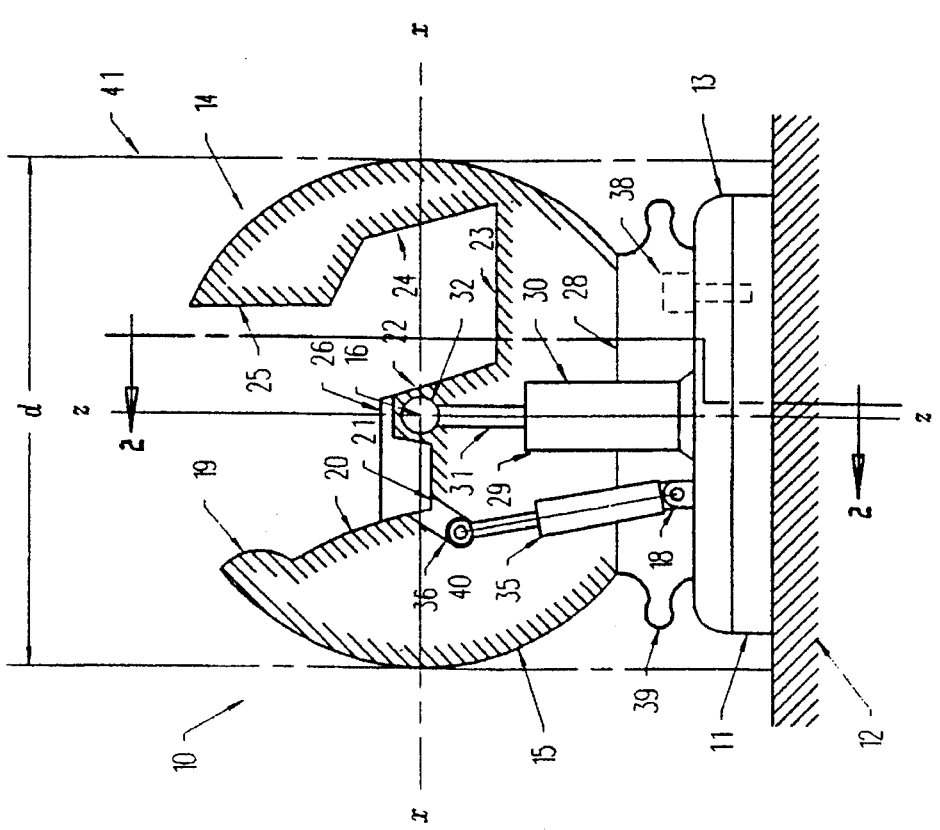
FIG. 1
FIG. 2

1

ARCADE AMUSEMENT RIDE MOTION SIMULATOR SYSTEM

CROSS-REFERENCE TO RELATED APPLICATIONS

This is a continuation of application Ser. No. 08/148,633, filed Nov. 5, 1993, now abandoned.

TECHNICAL FIELD

The present invention relates generally to the field of motion simulators for arcade-type amusement rides, and, more particularly, to an improved motion simulator for an unsupervised amusement ride.

BACKGROUND ART

Many forms of arcade-type amusements and rides exist in the prior art. Many of these include a visual display to give to a person riding thereon the illusion of riding in a vehicle. Some of these arcade-type devices are simplified versions of more-elaborate flight simulators.

Such flight simulators attempt to create a realistic "look" and "feel" to a would-be pilot. To this end, the conventional flight simulator has a capsule which closely approximates the cockpit of a airplane or spacecraft. A visual display, typically as it would appear when looking forwardly through the windshield of the aircraft, is displayed immediately in front of the pilot. At the same time, the capsule or cockpit is supported on a number of actuators, which can be selectively operated, either independently or in combination with one another, to simulate the "feel" of certain attitudes of the vehicle, as directed by the pilot or as external disturbances. Such conventional flight simulators are generally installed in specialized facilities, and are operated by well-trained and disciplined personnel to insure satisfactory performance and safety. Examples of such flight simulators may be found in U.S. Pat. Nos. 3,645,011 and 3,967,387.

The arcade-type amusement device attempts to simulate the performance of such a flight simulator. However, while graphics displayed before the pilot or driver may be creative and interactive, such amusement-type devices have heretofore not been capable of great movement. One reason for this is cost. Another reason is that such arcade-type devices are commonly used by, or near, children, and the use of such devices is typically not directly supervised. Thus, personal safety is of paramount importance to the operator of such arcades. Examples of such amusement-ride simulators are shown and described in U.S. Pat. Nos. 5,071,352 and 4,066,256.

To allow reasonably-safe operation without direct supervision, these arcade-type devices have been constrained to permit only slow and limited motion, and possibly one, two or three degrees of freedom. Such limitations restrict the realism of the ride, the graphics of the display notwithstanding. As the demand for increased realism and higher performance has increased, the emphasis on safety during unsupervised operation has become increasingly important. At the same time, it would be generally desirable to provide arcade-type amusement rides which would allow for motion in more than three degrees of freedom.

DISCLOSURE OF THE INVENTION

With parenthetical reference to the corresponding parts, portions or surfaces of the disclosed embodiment, merely for purposes of illustration and not by way of limitation, the present invention broadly provides an improved motion simulator (10) which is intended for unsupervised use, such as at an arcade. The improved simulator includes a base (11), and a capsule (14) having an at least partially-spherical smooth outer surface (15). The capsule is capable of at least one of roll, pitch, and yaw angular motions about a pivot point (16) at the center of the spherical surface, and is capable of upward and downward movement with the pivot point along a vertical axis (z—z) relative to the base. The improved simulator has at least one actuator (33, 34 or 35) arranged to move the capsule in one of the four possible degrees of freedom. In the preferred form, there are three such actuators, which may be operated independently or in cooperation with one another as desired. The capsule outer surface is configured such that no possible motion of the capsule in any of the permissible four degrees of freedom will cause any portion of the capsule to move outside a motion envelope formed by an imaginary vertical cylinder (41) having a diameter (d) substantially equal to that of the sphere.

The capsule may have a seat (21) for a rider, and a visual display screen (25). A circumferential flexing member (38) may be operatively arranged between the capsule and the base. If desired, this flexing member may define between the base and capsule a chamber (40) which is arranged to be supplied with fluid pressure to at least partially support the weight of the capsule. The capsule is constrained to rotate omnidirectionally about a spherical bearing. This bearing may be mounted on an actuator, and may therefore support at least some of the weight of the capsule. Alternatively, the bearing may be mounted on a rod which is simply telescopically received in a guide tube, such that the pivot point is constrained for upward and downward movement along a vertical axis. The actuators may be either electro-mechanical screw-and-nut mechanisms, direct-acting electromagnetic actuators, or hydraulically-powered piston-and-cylinder arrangements.

Accordingly, the general object of the invention is to provide an improved arcade-type amusement ride motion simulator system.

Another object is to provide an improved motion simulator system for moving a capsule along any or all of four possible degrees of freedom.

Another object is to provide an improved motion simulator having a generally-spherical capsule which may undergo motion in any or all of four degrees of freedom, but which is constrained from moving horizontally beyond a motion envelope formed by an imaginary vertical cylinder having a diameter substantially equal to that of the sphere.

Another object is to provide a motion simulator capsule which will be safe for bystanders, but which will allow for more-realistic operation along four degrees of freedom.

Still another object is to provide an improved motion simulator which is low-cost and reliable in operation.

These and other objects and advantages will become apparent from the foregoing and ongoing written specification, the drawings, and the appended claims.

BRIEF DESCRIPTION OF THE DRAWINGS

FIG. 1 is a schematic fragmentary longitudinal vertical sectional view of the improved motion simulator, taken generally on line 1—1 of FIG. 2, showing the capsule, the base, the telescopic guide, and the rear actuator.

FIG. 2 is a schematic fragmentary transverse vertical sectional view thereof, taken generally on line 2—2 of FIG.

1, showing the capsule, the base, the telescopic support, and the two lateral actuators.

DESCRIPTION OF THE PREFERRED EMBODIMENTS

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings and, more particularly, to FIGS. 1 and 2 thereof, the present invention broadly provides an improved motion simulator, of which the presently-preferred embodiment is generally indicated at 10. Simulator 10 is shown as having a horizontal disk-like base 11 arranged to rest on a suitable floor or support 12. A circular disk-like ring 13 is mounted on base 11 for rotation relative thereto about a central vertical axis, indicated at z—z. A capsule, generally indicated at 14, is operatively mounted on ring 13 for rotational movement therewith about vertical axis z—z. Capsule 14 is shown as having an outer partially-spherical smooth surface 15 generated about a point 16. A specially-configured transverse opening is provided through the capsule. This opening is bounded by a head rest portion 19, a back rest portion 20, a seat portion 21, and a leg rest cavity defined by surfaces 22, 23 and 24. A video is adapted to be displayed on a surface 25 located immediately in front of a person sitting in the seat just defined. Arm rests, severally indicated at 26, extend laterally in either direction from the seat, and open onto the spherical outer surface of the capsule. The capsule thus simulates a shell-type sphere, and is truncated at its lower end, as indicated at line 28. A guide or actuator, generally indicated at 29, is operatively disposed between ring 13 and the center of the capsule. More particularly, guide 29 has a lower cylinder portion 30 mounted on, and extending axially upwardly from, the center of ring member 13, and has an extensible rod portion 31 extending axially upwardly therefrom and terminating in a universal joint 32. The joint 32 has point 16 as the center of the capsule. Thus, the capsule is mounted on a bearing for bi-directional pivotal movement about point 16.

In the preferred form, member 29 may be in the form of a guide which constrains point 16 to move upwardly and downwardly along vertical axis z—z, but which does not otherwise support its weight. Alternatively, member 29 may be in the form of an electro-mechanical or electro-hydraulic actuator (e.g., a piston-and-cylinder) which may be selectively extended and retracted, as desired. In this form, member 29 could support at least some, if not all, of the weight of the capsule and any rider(s) thereon.

In the preferred form, three extensible linear actuators are provided to articulate the capsule relative to the base. There are two lateral actuators, indicated at 33 and 34, respectively, in FIG. 2, and a rear actuator, indicated at 35 in FIG. 1. Each of these actuators has the lower end of its cylinder pivotally connected to ring 13 via a clevis-type connection 18. The upper end of the extensible arm of each actuator is pivotally connected, as indicated at 36, to a lug member extending outwardly from the shell. These lug members are eccentric to the center of rotation of the capsule about point 16. Of course, suitable means (not shown) are provided to supply fluid to these actuators. Moreover, the actuators are arranged in suitable control loops in order that the capsule may be selectively moved to desired positions. In addition, a rotary drive is provided in the form of a motor-driven pinion, mounted on ring 13, which engages an internal ring gear on base 11, which can cause the entire capsule to rotate about axis z—z.

FIGS. 1 and 2 illustrate three mutually-orthogonal axes. The vertical axis is indicated at z—z in both figures. The two mutually-perpendicular horizontal axes are indicated at x—x, and y—y, respectively. There are six potential degrees of freedom. These include fore-and-aft or surge motion along horizontal axis x—x. The second type is lateral or sway motion along axis y—y. The third is up-and-down or heave motion along axis z—z. In addition to this, roll is defined as rotation about the longitudinal axis (x—x), pitch is defined as rotation about the transverse axis (y—y), and yaw is defined as rotation about the vertical axis (z—z).

The present invention permits motion in four degrees of freedom, but restricts motion in the other two. More particularly, the improved motion simulator may be operated, by selective extension or retraction of actuators 33, 34 and 35, either singly or in combination, to cause roll, pitch and heave motions. A suitable motor, generally indicated at 38, is operatively arranged to selectively rotate the ring member 13 and the capsule relative to stationary base 11 about vertical axis z—z. Thus, there are four permissible degrees of movement. Horizontal surge and sway motion along axis x—x and y—y are, however, restrained by limiting the motion of pivot point 16 to vertical upward and downward motion. This cannot move laterally.

Adverting now to the drawing figures, the truncated spherical capsule is sealingly connected to ring member 13 via circumferential flexing member 39, such as a bellows. This bellows permits roll, pitch, yaw and heave motion of the capsule relative to ring member 13, while preserving the fluid-tight sealed integrity of a chamber 40 within the capsule. Suitable means may be provided to pressurize chamber 40, if desired, so as to at least partially support the weight of the capsule and any rider.

Therefore, the invention broadly provides an improved arcade-type amusement ride motion simulator system having a capsule 14 operatively mounted for roll, pitch, yaw and heave motions relative to a stationary base 11. The various roll, pitch and yaw movements are constrained to cause rotation of the capsule about point 16. Thus, during such roll, pitch, yaw or heave motion, no portion of the capsule will move outside of a motion envelope formed by an imaginary vertical cylinder, indicated generally at 41, having a diameter (d) substantially equal to that of the sphere. Thus, a person standing adjacent to the capsule will not be forcibly bumped by lateral horizontal motion of the capsule. Rather, such adjacent persons will only experience sliding movement of the capsule relative to their presence. Such sliding motion may be in either the roll, pitch, yaw or heave directions.

Modifications

The present invention contemplates that many changes and modifications may be made. For example, the base and ring member may assume forms other than those specifically shown. Secondly, while the capsule must have an at least partially-spherical smooth outer surface, it need not be exactly configured as shown in the accompanying drawings. Indeed, the particular form and shape of capsule shown is merely illustrative of one possible embodiment. While the capsule must be capable of at least one of roll, pitch and yaw angular motions about a pivot point at the center of the spherical surface, and must be also be capable of upward and downward motion along a vertical axis relative to the base. Thus, the improved capsule is potentially capable of four degrees of motion. Only lateral surge and sway motions are restrained for the protection of those standing near the amusement ride. The invention also includes one or more actuators operatively arranged to move the capsule relative to the base in the four degrees of freedom. As indicated above, the various actuators may be electro-hydraulic, or, alternatively, may be linear electro-mechanical screw-and-nut mechanisms or direct-acting electromagnetic actuators. These actuators may be readily incorporated into closed servoloops to insure that the capsule moves to a position as electrically commanded.

As previously noted, the central support 29 may be either in the form of a vertical rod simply telescopically received in a guide tube, so as to restrain surge and sway motions while permitting heave motion. Alternatively, member 29 may be in the form of a suitable electrical or fluid actuator. If the latter arrangement, the actuator may at least partially support the weight of the capsule. If the capsule is connected to the base via a flexible member, such as a bellows, then there is a distinct possibility of pressurizing the chamber between the capsule and the base so as to partially support the weight of the capsule and any rider. Alternatively, the bi-directional universal joint and rotating ring could be replaced by a ball pivot or spherical bearing.

Therefore, while the preferred embodiment of the improved motion simulator system has been shown and described, and several modifications and changes thereof, persons skilled in this art will readily appreciate that various additional changes and modifications may be made without departing from the spirit of the invention, as defined and differentiated by the following claims.

What is claimed is:

1. In a motion simulator intended for essentially unsupervised use, the improvement which comprises:

a base;

a capsule having a smooth outer surface configured as a portion of a sphere;

said capsule being capable of at least one of roll, pitch and yaw angular motions about a pivot point at the center of said sphere;

extensible guide means having one end mounted on said base and having a distal end arranged proximate said pivot point for constraining said pivot point to move upwardly and downwardly along a vertical axis relative to said base;

bearing means operatively arranged within said capsule between said guide means distal end and said capsule to permit such angular motions of said capsule; and at least one actuator arranged to move said capsule in one of such four possible degrees of freedom;

said capsule being configured such that no possible motion of said capsule in any of said four degrees of freedom will cause any portion of said capsule to move outside of a motion envelope formed by an imaginary vertical cylinder having a diameter substantially equal to that of said spherical surface.

2. The improvement as set forth in claim 1 wherein said capsule has a seat for a rider and a visual display screen.

3. The improvement as set forth in claim 1 wherein said outer surface is truncated below its major horizontal diameter.

4. The improvement as set forth in claim 3, and further comprising a circumferential flexing member operatively arranged between said capsule and base to allow pitch, roll, yaw and heave motion of said capsule relative to said base.

5. The improvement as set forth in claim 4 wherein said flexing member is sealed to said base and capsule to define a chamber which is adapted to be supplied with fluid pressure to at least partially support the weight of said capsule.

6. The improvement as set forth in claim 1 and further comprising a ring member rotatably mounted on said base, wherein yaw motion of said capsule is permitted by selective rotation of said ring member relative to said base, and further comprising an actuator mounted between said ring member and said capsule.

7. The improvement as set forth in claim 6 and further comprising an motor mounted between said ring member and said base.

8. The improvement as set forth in claim 6 wherein said extensible guide means has one end mounted on said ring member.

9. The improvement as set forth in claim 1 wherein said bearing means includes a universal joint.

10. The improvement as set forth in claim 1 wherein said bearing means includes a spherical bearing.

11. The improvement as set forth in claim 1 wherein said extensible guide means includes a vertical rod telescopically received in a tube mounted on said base.

12. The improvement as set forth in claim 10 wherein said rod and tube constitute a piston and cylinder, and wherein fluid pressure may be supplied to said piston to at least partially support the weight of said capsule.

13. The improvement as set forth in claim 1 wherein one actuator is a linear electro-mechanical screw-and-nut mechanism.

14. The improvement as set forth in claim 1 wherein one actuator is a hydraulically-powered piston-and-cylinder.

15. The improvement as set forth in claim 1 wherein one actuator is a linear electromagnetic actuator.

* * * * *